(12) United States Patent
Chang

(10) Patent No.: US 7,494,245 B2
(45) Date of Patent: Feb. 24, 2009

(54) BACKLIGHT MODULE WITH LIGHT EMITTING DIODES HAVING REFLECTIVE SHEETS

(75) Inventor: Shao-Han Chang, Taipei Hsien (TW)

(73) Assignee: Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 0 days.

(21) Appl. No.: 11/565,588

(22) Filed: Nov. 30, 2006

(65) Prior Publication Data
US 2008/0074862 A1     Mar. 27, 2008

(30) Foreign Application Priority Data
Sep. 27, 2006    (CN) .................. 2006 1 0200924

(51) Int. Cl.
*F21V 5/04*    (2006.01)
(52) U.S. Cl. .................. 362/245; 362/346; 362/241; 362/800
(58) Field of Classification Search .................. 362/245, 362/236, 237, 240, 241, 346
See application file for complete search history.

(56) References Cited

U.S. PATENT DOCUMENTS

| | | | | |
|---|---|---|---|---|
| 6,972,439 | B1 * | 12/2005 | Kim et al. | 257/98 |
| 6,974,229 | B2 * | 12/2005 | West et al. | 362/227 |
| 7,172,325 | B2 * | 2/2007 | Kim et al. | 362/561 |
| 7,320,531 | B2 * | 1/2008 | West et al. | 362/231 |
| 2006/0087827 | A1 * | 4/2006 | Jung et al. | 362/29 |
| 2007/0047232 | A1 * | 3/2007 | Kim et al. | 362/305 |

* cited by examiner

*Primary Examiner*—Jong-Suk (James) Lee
*Assistant Examiner*—Leah S Lovell
(74) *Attorney, Agent, or Firm*—Steven M. Reiss

(57) ABSTRACT

An exemplary backlight module (30) includes a frame (31), a plurality of light emitting diodes (32) and at least one optical plate (34). The light emitting diodes are regularly disposed on a base of the frame. The optical plate is positioned on sidewalls of the frame. Each light emitting diode includes a light output unit (321), an optical lens (323) having a light input surface (3231), a top surface (3233), and a light output surface (3235); and a reflective sheet (325) including a peripheral flange extending down from an edge thereof for being interference fitted around the top surface of the optical lens. The backlight module can have a thin configuration while still providing good, uniform optical performance.

19 Claims, 6 Drawing Sheets

BACKLIGHT MODULE WITH LIGHT EMITTING DIODES HAVING REFLECTIVE SHEETS

BACKGROUND OF THE INVENTION

1. Field of the Invention

The present invention relates to backlight modules, and more particularly to a direct type backlight module typically used in a liquid crystal display (LCD).

2. Discussion of the Related Art

In a liquid crystal display device, liquid crystal is a substance that does not itself radiate light. Instead, the liquid crystal relies on light received from a light source in order to provide displaying of images and data. In the case of a typical liquid crystal display device, a backlight module powered by electricity supplies the needed light.

Typically, a light source of a backlight module is one of the following two types: a cold cathode fluorescence lamp (CCFL), or a light emitting diode (LED). Disadvantages of a CCFL include high energy consumption, low optical uniformity, and poor purity of white light. In addition, after being repeatedly used over time, a brightness of the CCFL becomes degraded and a color of light emitted by the CCFL tends to shift. In general, the service life of a CCFL is about 15,000 to 25,000 hours. Furthermore, a CCFL only covers 75 percent of color space as defined by the National Television Standards Committee (NTSC). Therefore, using a CCFL cannot satisfy the requirements for a high quality color liquid crystal display. Unlike CCFLs, high powered LEDs can cover as much as 105 percent of color space as defined by the NTSC. In addition, these LEDs have other advantages such as low energy consumption, long service life, and so on. Therefore, high power LEDs are better suited for producing high quality color liquid crystal displays.

FIG. 6 illustrates a conventional backlight module 10 using a plurality of LEDs 12. The backlight module 10 includes a frame 11, an optical plate 14, and the LEDs 12. The frame 11 includes a base 112, and a plurality of sidewalls 114 extending from a periphery of the base 112. Top portions of the sidewalls 114 cooperatively form an opening 116 therebetween. The LEDs 12 are regularly arranged on the base 112 of the frame 11. The optical plate 14 is disposed on the frame 11 over the opening 116. Light rays emitted by the LEDs 12 are diffused in the optical plate 14, so that substantially planar light is outputted from the optical plate 14.

Each LED 12 includes a light output unit 121, and an optical lens 123 coupled to the light output unit 121. The optical lens 123 includes a light input surface 1231, a top surface 1233 opposite to the light input surface 1231, and a peripheral light output surface 1235 generally between the light input surface 1231 and the top surface 1233. Light rays emitted by the light output unit 121 enter the optical lens 123 through the light input surface 1231 and transmit to the top surface 1233. Many or most of the light rays undergo total internal reflection at the top surface 1233, and then exit the optical lens 123 through the light output surface 1235.

However, a significant proportion of the light rays still escapes from the optical lens 123 through the top surface 1233. This would ordinarily cause a bright area to occur in the optical plate 14 above the LED 12. In order to prevent this problem, the backlight module 10 further includes a transparent plate 13 disposed between the optical plate 14 and the LEDs 12. The transparent plate 13 defines a plurality of reflective layers 15 on a bottom thereof. The reflective layers 15 are positioned in one-to-one correspondence with the LEDs 12. However, precisely positioning the transparent plate 15 according to the LEDs 12 can be very problematic and troublesome, due to the small size of the LEDs 12. In addition, the transparent plate 13 makes the backlight module 10 rather heavy, and adds to manufacturing costs.

What is needed, therefore, is a new backlight module which can overcome the above-described shortcomings.

SUMMARY

A backlight module according to a preferred embodiment includes a frame, a plurality of light emitting diodes and at least one optical plate. The frame includes a base and a plurality of sidewalls extending from a periphery of the base. Distal portions of the sidewalls cooperatively define an opening therebetween. The light emitting diodes are regularly disposed on the base of the frame. The optical plate is positioned on the frame above the opening. Each light emitting diode includes a light output unit, an optical lens having a light input surface facing the light output unit, a top surface opposite to the light input surface, and a light output surface generally between the light input surface and the top surface; and a reflective sheet. The reflective sheet includes a peripheral flange extending down from an edge of the reflective sheet, configured for being interference fitted around the top surface of the optical lens Other advantages and novel features will become more apparent from the following detailed description of various embodiments when taken in conjunction with the accompanying drawings.

BRIEF DESCRIPTION OF THE DRAWINGS

The components in the drawings are not necessarily drawn to scale, the emphasis instead being placed upon clearly illustrating the principles of the present backlight module. Moreover, in the drawings, like reference numerals designate corresponding parts throughout the several views, and all the views are schematic.

DETAILED DESCRIPTION OF THE PREFERRED EMBODIMENTS

Reference will now be made to the drawings to describe preferred embodiments of the present backlight module in detail.

Figure 1:
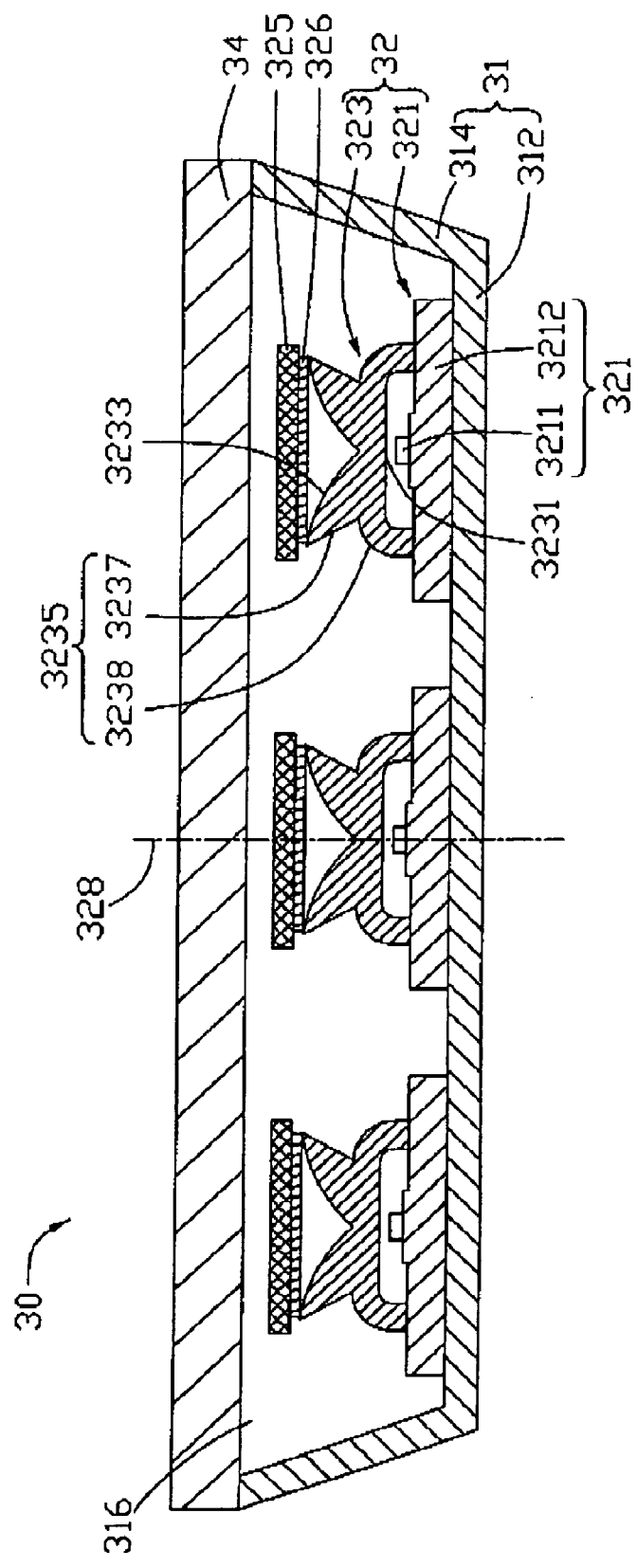
FIG. 1 is a side cross-sectional view of a backlight module according to a first preferred embodiment of the present invention.

Referring to FIG. 1, a backlight module 30 in accordance with a first preferred embodiment of the present invention is shown. The backlight module 30 includes a frame 31, a plurality of light emitting diodes 32, and at least one optical plate 34. The frame 31 includes a base 312, and a plurality of sidewalls 314 extending from a periphery of the base 312. Top portions of the sidewalls 314 cooperatively form an opening 316 therebetween. The light emitting diodes 32 are disposed on the base 312 of the frame 31 in a matrix. In the illustrated embodiment, the at least one optical plate 34 is a single optical plate 34. The optical plate 34 is positioned on top of the frame 31 above the opening 316.

Each of the light emitting diodes 32 includes a light output unit 321, an optical lens 323, and a reflective sheet 325. Each light emitting diode 32 defines a central vertical axis 328, which passes through centers of the light output unit 321, the optical lens 323, and the reflective sheet 325. The light output unit 321 includes a substrate 3212, and a semiconductor chip 3211 fixed on the substrate 3212. The semiconductor chip 3211 has a light emitting PN (P-type silicon N-type silicon) junction. The optical lens 323 includes a light input surface 3231, a top surface 3233 opposite to the light input surface 3231, and a peripheral light output surface 3235 generally between the light input surface 3231 and the top surface 3233. The light input surface 3231 has an inverted, generally U-shaped cross-section taken along a plane passing through the axis 328. The top surface 3233 is somewhat funnel-shaped.

The reflective sheet 325 is affixed on a peripheral rim of the top surface 3233 by an adhesive member 326. The adhesive member 326 can be either a thin slab of adhesive material or a piece of double-sided adhesive tape, and can be either transparent or opaque. In this embodiment, the adhesive member 326 is a piece of transparent double-sided adhesive tape. The reflective sheet 325 is a disk-like metal sheet, which is configured to entirely cover the top surface 3233. The metal sheet is preferably made of either aluminum or silver. In an alternative embodiment, the reflective sheet 325 can include a transparent base sheet and a thin metal film coated on the transparent base sheet. The thin metal film is located at a side of the reflective sheet 325 nearest to the optical lens 323.

The optical lens 323 is snap-fitted or otherwise mounted onto the substrate 3212 of the light output unit 321. Thereby, the light input surface 3231 faces the semiconductor chip 3211, and the light input surface 3231 and the substrate 3212 cooperatively completely surround the semiconductor chip 3211. Light rays emitted by the light output unit 321 enter the optical lens 323 through the light input surface 3231. The light rays transmit to the top surface 3233. Many or most of the light rays undergo total internal reflection at the top surface 3233. Other light rays that escape through the top surface 3233 are reflected back into the optical lens 323 by the reflective sheet 325. Finally, all the light rays exit the optical lens 323 through the light output surface 3235.

In order to improve light output uniformity, the light output surface 3235 can be configured to include a first refractive surface 3237, and a second refractive surface 3238 adjacent to the first refractive surface 3237. In the illustrated embodiment, the first refractive surface 3237 has the shape of a periphery of a frustum. The second refractive surface 3238 has the shape of an outer portion of a flat-topped dome. The first refractive surface 3237 is designed to refract and bend light so that the light exits from the optical lens 323 at angles as close to 90 degrees to the axis 328 as possible.

The reflective sheet 325 of the light emitting diode 32 is configured to prevent light that escapes through the top surface 3233 from propagating directly to the optical plate 34. Thus the light emitting diode 32 has relatively more light rays output through the light output surface 3235 of the optical lens 323 compared with a similar light emitting diode without the reflective sheet 325. In addition, a distance from the light emitting diodes 32 to the optical plate 34 may be configured to be very short, yet with little or no risk of dark areas occurring in the optical plate 34 due to reduced intensity of light in areas between the adjacent light emitting diodes 32. Thus the backlight module 30 can have a thin configuration while still providing good, uniform optical performance.

Figure 2:
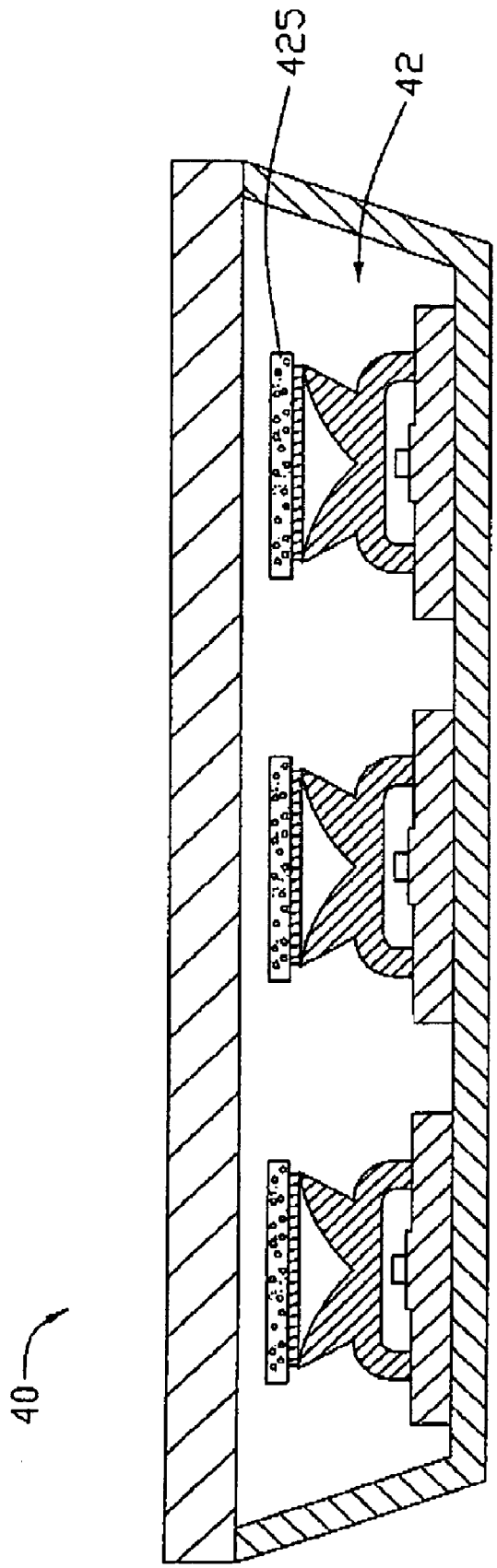
FIG. 2 is a side cross-sectional view of a backlight module according to a second preferred embodiment of the present invention.

Referring to FIG. 2, a backlight module 40 in accordance with a second preferred embodiment of the present invention is shown. The backlight module 40 is similar in principle to the backlight module 30, except that each of light emitting diodes 42 of the backlight module 40 includes a reflective sheet 425. The reflective sheet 425 is made of transparent resin matrix material with a plurality of reflective particles uniformly dispersed in the transparent resin matrix material. The transparent resin matrix material of the reflective sheet 425 can be selected from the group consisting of acrylate resin, acrylate amino resin, epoxy resin, and any suitable combination thereof. A refractive index of the reflective particles is in the range from about 1.6 to about 2.75. A uniform diameter of the reflective particles is preferably selected to be in the range of from about 0.01 microns to about 5 microns. The reflective particles may be selected from the group consisting of titanium dioxide ($TiO_2$) particles, barium sulfate ($BaSO_4$) particles, zinc sulfide (ZnS) particles, zinc oxide (ZnO) particles, antimony oxide ($Sb_2O_3$ or $Sb_2O_5$) particles, calcium carbonate ($CaCO_3$) particles, and any suitable combination thereof. A light transmission ratio of the reflective sheet 425 can be configured by controlling a thickness of the reflective sheet 425. A ratio by weight of the reflective particles to the transparent resin matrix material can be controlled to obtain a desired light transmission ratio for the reflective sheet 425.

Figure 3:
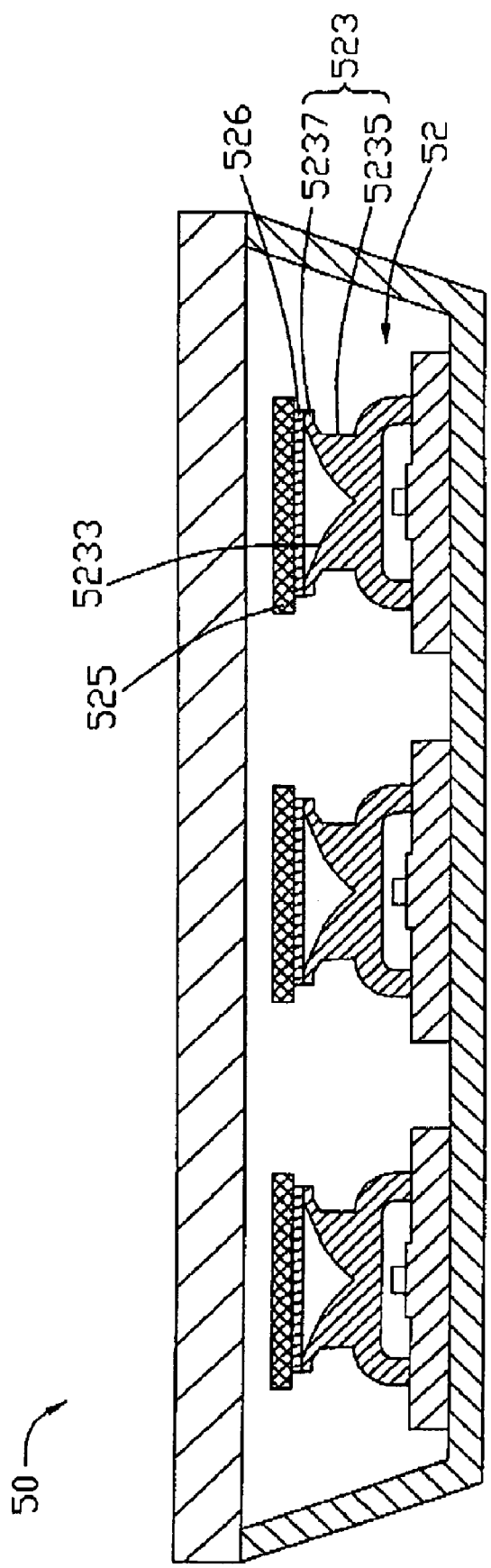
FIG. 3 is a side cross-sectional view of a backlight module according to a third preferred embodiment of the present invention.

Referring to FIG. 3, a backlight module 50 in accordance with a third preferred embodiment of the present invention is shown. The backlight module 50 is similar in principle to the backlight module 30, except that each of light emitting diodes 52 of the backlight module 50 includes an optical lens 523. The optical lens 523 includes a supporting ring portion 5237 extending horizontally outward from a top periphery of a light output surface 5235. The supporting ring portion 5237 adjoins a top surface 5233 of the optical lens 523. The supporting ring portion 5237 is configured for providing a substantial contact area with an adhesive member 526. Thereby, a reflective sheet 525 can be firmly supported on the optical lens 523.

Figure 4:
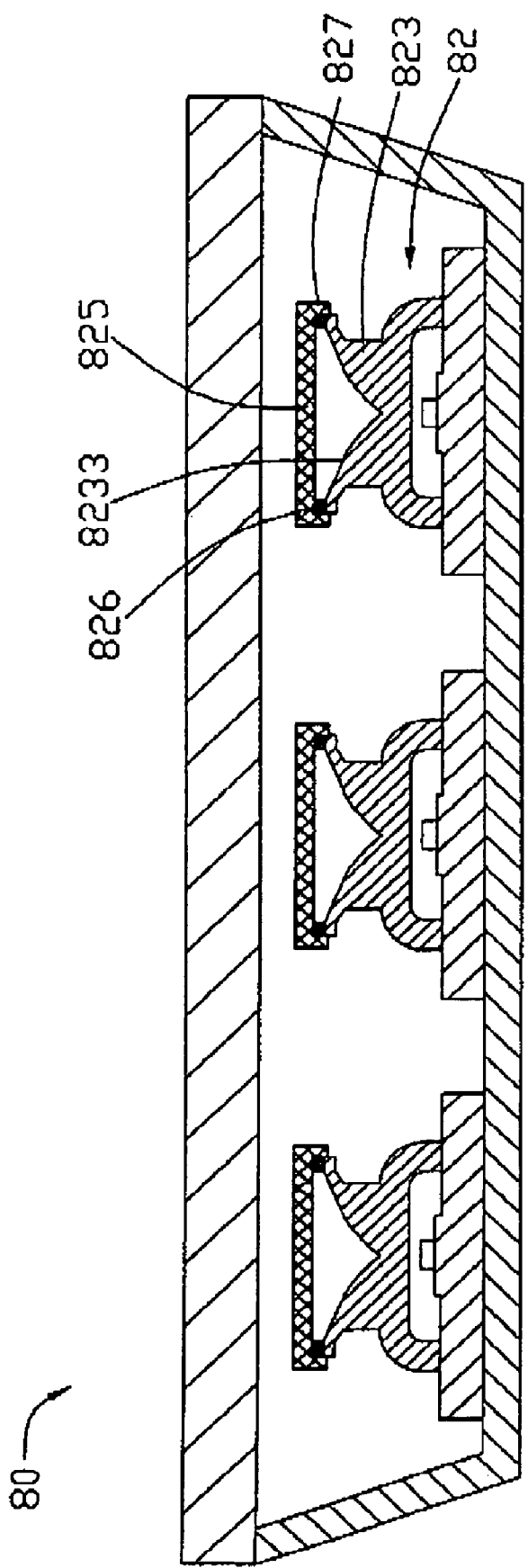
FIG. 4 is a side cross-sectional view of a backlight module according to a fourth preferred embodiment of the present invention.

Referring to FIG. 4, a backlight module 80 in accordance with a fourth preferred embodiment of the present invention is shown. The backlight module 80 is similar in principle to the backlight module 50, except that each of light emitting diodes 82 of the backlight module 80 includes a reflective sheet 825. The reflective sheet 825 includes a peripheral flange 827 extending down from an edge thereof. In this embodiment, the reflective sheet 825 can be interference fitted over a top surface 8233 of an optical lens 823. In particular, the peripheral flange 827 can be interference fitted around a side periphery of a supporting ring portion (not labeled) of the optical lens 823. This facilitates adhesion provided by an annular adhesive member 826. In an alternative embodiment, the adhesive member 826 can be omitted.

Figure 5:
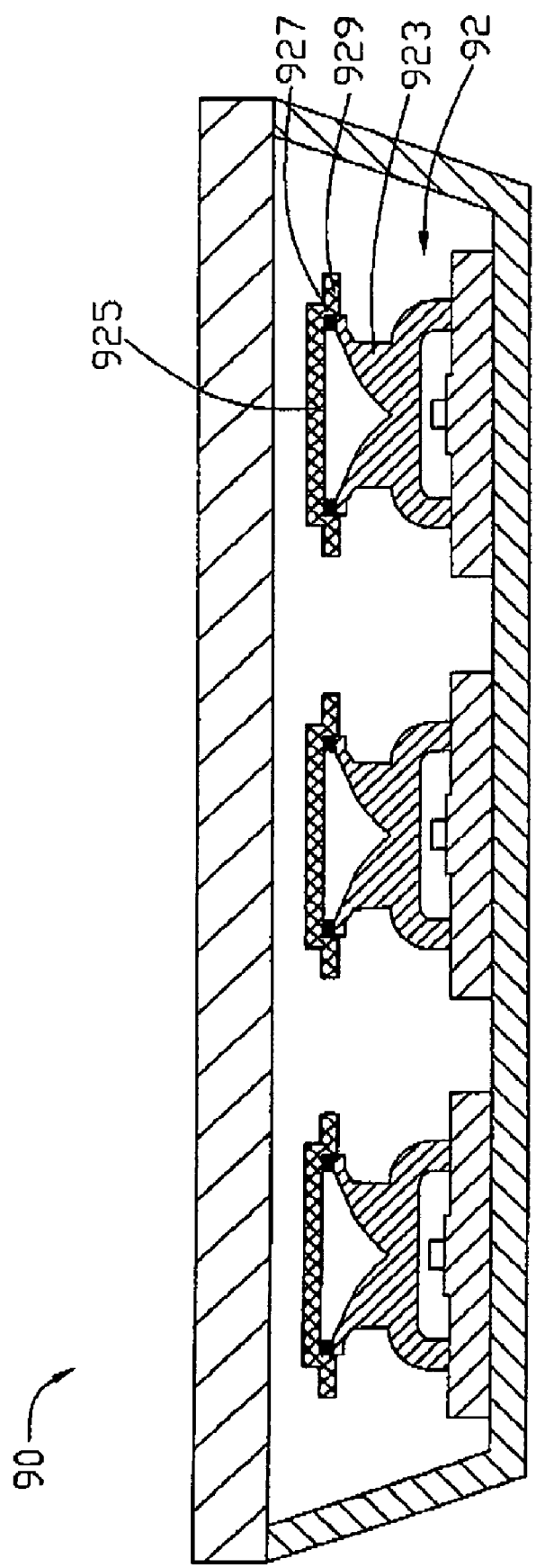
FIG. 5 is a side cross-sectional view of a backlight module according to a fifth preferred embodiment of the present invention.
Figure 6:
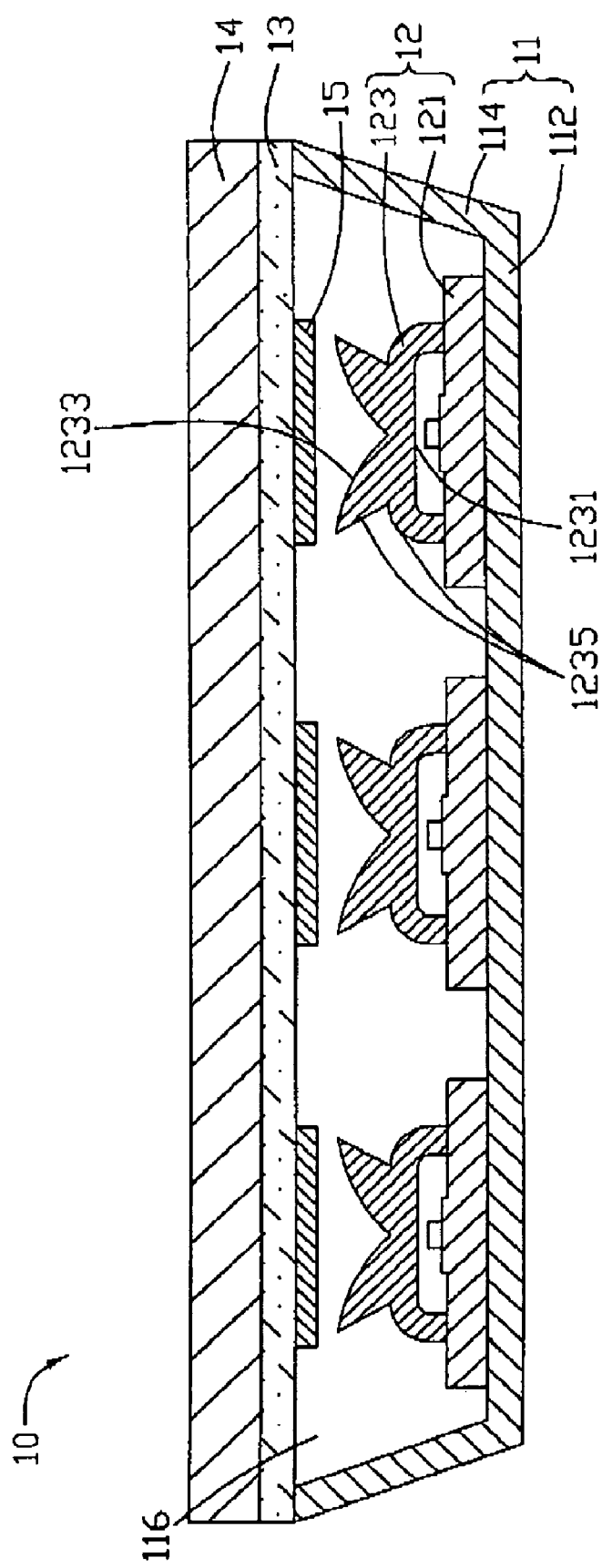
FIG. 6 is a side cross-sectional view of a conventional backlight module having a plurality of light emitting diodes.

Referring to FIG. 5, a backlight module 90 in accordance with a fifth preferred embodiment of the present invention is shown. The backlight module 90 is similar in principle to the backlight module 80, except that each of light emitting diodes 92 of the backlight module 90 includes a reflective sheet 925. The reflective sheet 925 includes a peripheral ring portion 929 horizontally extending outward from a bottom of a flange 927. The flange 927 can be interference fitted around a side periphery of a supporting ring portion (not labeled) of an optical lens 923. The light emitting diode 92 can be assembled and disassembled conveniently by manipulation of the flange portion 929.

It is to be noted that the shape of the optical lens of each light emitting diode is not limited to the shapes described above and illustrated in relation to the preferred embodiments. Other suitable shapes for the optical lens should be considered within the scope of the present disclosure. Accordingly, the reflective sheet can be configured to match with the particular shape of the optical lens in each particular embodiment.

Finally, while particular embodiments have been described and illustrated, the invention is not to be construed as being limited thereto. Various modifications can be made to the embodiments by those skilled in the art without departing from the true spirit and scope of the invention as defined by the appended claims.

What is claimed is:

1. A backlight module comprising:
   a frame having a base and a plurality of sidewalls extending from the base, distal portions of the sidewalls cooperatively defining an opening therebetween;
   a plurality of light emitting diodes disposed on the base; and
   at least one optical plate positioned on the frame above the opening, wherein each light emitting diode includes:
   a light output unit;
   an optical lens having a light input surface facing the light output unit, a top surface opposite to the light input surface, and a light output surface generally between the light input surface and the top surface; and
   a reflective sheet including a peripheral flange extending down from an edge thereof for being interference fitted around the top surface of the optical lens.

2. The backlight module according to claim 1, wherein the reflective sheet is a metal sheet.

3. The backlight module according to claim 2, wherein the metal sheet is made of one of aluminum and silver.

4. The backlight module according to claim 1, wherein The reflective sheet comprises a transparent base sheet and a thin metal film coated on the transparent base sheet.

5. The backlight module according to claim 1, wherein the reflective sheet is made of transparent resin matrix material and a plurality of reflective particles dispersed in the transparent resin matrix material.

6. The backlight module according to claim 5, wherein the transparent resin matrix material is selected from the group consisting of acrylate resin, acrylate amino resin, epoxy resin, and any combination thereof.

7. The backlight module according to claim 5, wherein the reflective particles are selected from the group consisting of titanium dioxide particles, barium sulfate particles, zinc sulfide particles, zinc oxide particles, antimony oxide particles, calcium carbonate particles, and any combination thereof.

8. The backlight module according to claim 5, wherein a refractive index of the reflective particles is in the range from about 1.6 to about 2.75.

9. The backlight module according to claim 1, wherein each light emitting diode defines a central axis, and the light input surface of the optical lens has an inverted generally U-shaped cross-section taken along a plane passing through the central axis.

10. The backlight module according to claim 1, wherein the top surface is generally funnel-shaped.

11. The backlight module according to claim 1, wherein the light output surface comprises a first refractive surface having the shape of a periphery of a frustum, and a second refractive surface adjacent to the first refractive surface, and the second refractive surface has the shape of an outer portion of a flat-topped dome.

12. The backlight module according to claim 1, wherein the reflective sheet is affixed on the top surface of the optical lens by an adhesive member.

13. The backlight module according to claim 12, wherein the adhesive member is transparent or annular.

14. The backlight module according to claim 1, wherein the optical lens further comprises a peripheral ring portion extending outward from a top of the light output surface.

15. The backlight module according to claim 1, wherein the reflective sheet further comprises a flange portion perpendicularly extending outward from the peripheral flange.

16. A backlight module comprising:
    a base;
    a plurality of light emitting diodes disposed on the base; and
    at least one optical plate positioned above the light emitting diodes, wherein each light emitting diode includes a light output unit, an optical lens optically coupled to the light output unit, and a reflective sheet including a peripheral flange extending down from an edge thereof for being interference fitted around top surface of the optical lens, wherein light rays escaping from the top of the optical lens are reflected back into the optical lens by the reflective sheet and subsequently emit from one or more sides of the optical lens.

17. The backlight module according to claim 16, wherein the reflective sheet is a metal sheet.

18. The backlight module according to claim 16, wherein the reflective sheet comprises a transparent base sheet and a thin metal film coated on the transparent base sheet.

19. The backlight module according to claim 16, wherein the reflective sheet is made of transparent resin matrix material and a plurality of reflective particles dispersed in the transparent resin matrix material.

* * * * *